United States Patent
Lee et al.

(10) Patent No.: US 8,494,494 B2
(45) Date of Patent: Jul. 23, 2013

(54) MOBILE TERMINAL AND METHOD OF CONTROLLING MOBILE TERMINAL

(75) Inventors: Won Jong Lee, Gwangmyeong-si (KR); Ju O Jung, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 12/388,193

(22) Filed: Feb. 18, 2009

(65) Prior Publication Data
US 2010/0004026 A1    Jan. 7, 2010

(30) Foreign Application Priority Data
Jul. 7, 2008    (KR) .......................... 10-2008-0065373

(51) Int. Cl.
*H04M 3/42*    (2006.01)
(52) U.S. Cl.
USPC ........ 455/414.1; 455/425; 455/566; 455/466; 455/186.1
(58) Field of Classification Search
USPC ..... 455/414.1, 425, 566, 466, 486.1; 345/173
See application file for complete search history.

(56) References Cited

U.S. PATENT DOCUMENTS

| | | | |
|---|---|---|---|
| 6,396,523 B1 | 5/2002 | Segal et al. | |
| 2005/0026580 A1* | 2/2005 | Saeki | 455/173.1 |
| 2006/0031886 A1 | 2/2006 | Bae et al. | |
| 2007/0291709 A1* | 12/2007 | Wassingbo et al. | 370/338 |
| 2008/0074550 A1* | 3/2008 | Park | 348/565 |
| 2008/0155057 A1* | 6/2008 | Khedouri et al. | 709/217 |

FOREIGN PATENT DOCUMENTS

| | | |
|---|---|---|
| CN | 1967613 | 5/2007 |
| EP | 0 961 199 | 12/1999 |
| EP | 1 865 693 | 12/2007 |
| WO | WO 03/073411 | 9/2003 |

OTHER PUBLICATIONS

European Search Report dated Nov. 12, 2009.

* cited by examiner

*Primary Examiner* — Manpreet Matharu
(74) *Attorney, Agent, or Firm* — KED & Associates, LLP

(57) ABSTRACT

A terminal and controlling method thereof may be provided such that a terminal user may select a specific channel from a plurality of broadcast channels received by a mobile terminal. A broadcast receiving unit may receive a broadcast, a touchscreen may display a broadcast channel number, and a controller may control a broadcast channel number to be changed per number place if a touch & drag is performed on the touchscreen with a pointer.

20 Claims, 21 Drawing Sheets

CH 34
HBO Die Hard (19-1)

CH 34-2

(19-2)

CH 35
News CNN (19-3)

CH 52
MBC drama (19-4)

CH 52
Favorite (19-5)

MOBILE TERMINAL AND METHOD OF CONTROLLING MOBILE TERMINAL

This application claims priority from Korean Patent Application No. 10-2008-0065373, filed Jul. 7, 2008, the subject matter of which is incorporated herein by reference.

BACKGROUND

1. Field

Embodiments of the present invention may relate to a terminal and a controlling method of a mobile terminal.

2. Background

A mobile terminal may perform various functions. Examples of such functions may include data and voice communications, capturing images and video via a camera, recording audio, playing music files and outputting music via a speaker system, and displaying images and video on a display. Terminals may include additional functionality that supports game playing, while other terminals may also be configured as multimedia players. Mobile terminals may receive broadcast and multicast signals that permit viewing of contents, such as videos and television programs.

Terminals may be classified into mobile terminals and stationary terminals according to a presence or non-presence of mobility. The mobile terminals may be further classified into handheld terminals and vehicle mount terminals according to availability for hand-carry.

Efforts are ongoing to support and increase functionality of mobile terminals. The efforts include software and hardware improvements, as well as changes and improvements in structural components that form the mobile terminal.

As the broadcast receiving function is further raised, diverse broadcast programs may be transmitted on more broadcast channels. It may become more difficult to decide a program transmitted on a specific one of the various broadcast channels.

BRIEF DESCRIPTION OF THE DRAWINGS

Arrangements and embodiments may be described in detail with reference to the following drawings in which like reference numerals refer to like elements and wherein:

FIGS. 17 to 19 show display screens according to an example embodiment of the present invention;

DETAILED DESCRIPTION

Embodiments of the present invention may provide a terminal and controlling method thereof, by which a terminal user may select a specific channel from a plurality of broadcast channels received by a mobile terminal.

A mobile terminal may be provided that includes a broadcast receiving unit to receive a broadcast, a touchscreen to display a broadcast channel number, and a controller to control a broadcast channel number to be changed per digit position (or per number place) when the touchscreen is touched and dragged with a pointer.

A method may be provided for controlling a mobile terminal that includes displaying a broadcast channel number, and changing a broadcast channel number per digit position (or number place) when a touchscreen is touched and dragged.

The suffixes 'module', 'unit' and 'part' may be used for various elements. Significant meanings or roles may not be given to the suffixes themselves and it is understood that the 'module', 'unit' and 'part' may be used together or interchangeably.

Embodiments of the present invention may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and navigators.

A further description will be provided with regard to a mobile terminal, although such teachings may apply equally to other types of terminals.

Figure 1:
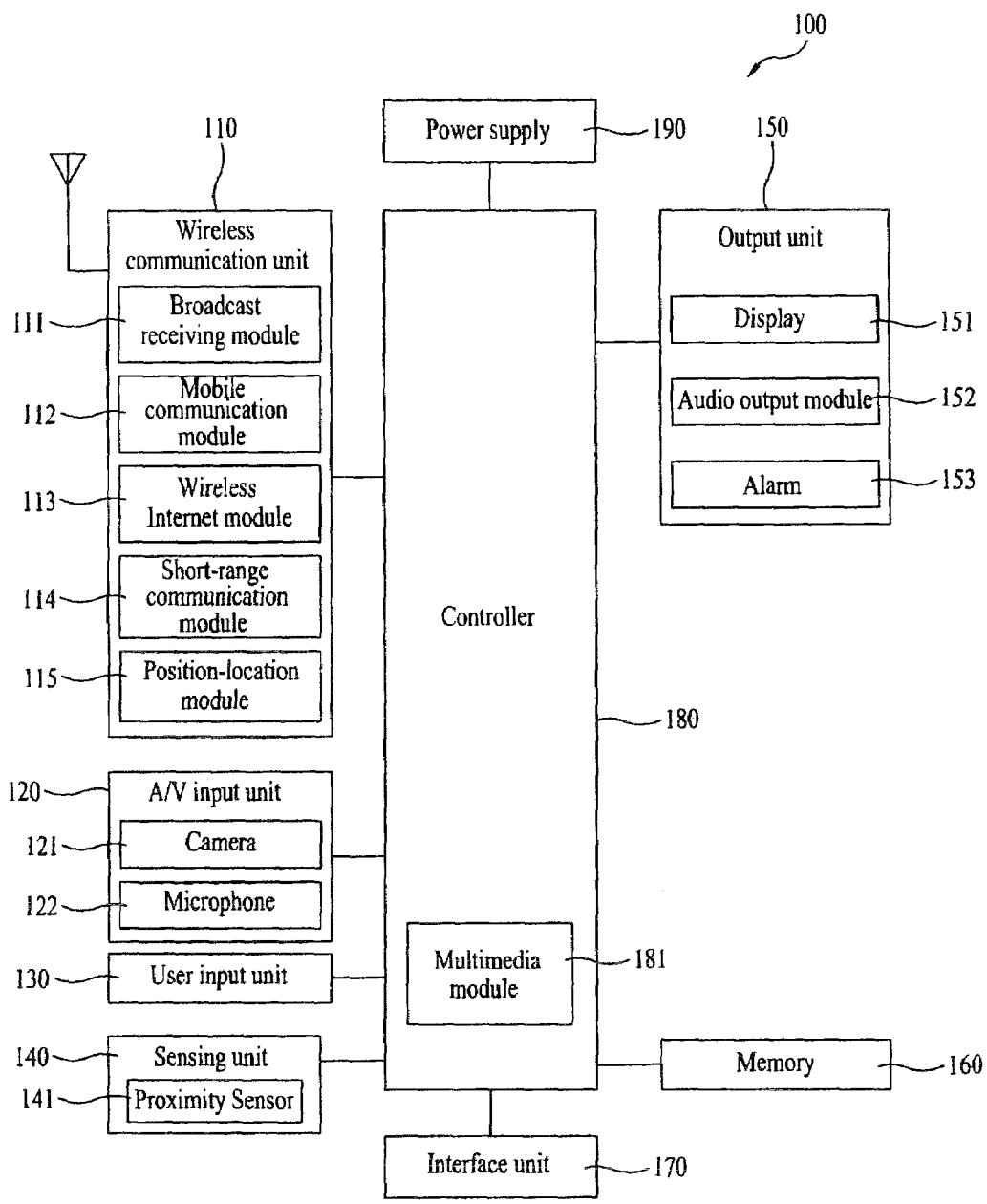
FIG. 1 is a block diagram of a mobile terminal in accordance with an example embodiment.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be commonly referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The interface unit 170 may couple the mobile terminal 100 with external devices, such as wired/wireless headphones, external chargers, power supplies, storage devices configured to store data (e.g., audio, video, and pictures) as well as earphones and microphones. The interface unit 170 may use a wired/wireless data port, audio input/output ports, a video input/output port, a card socket for coupling to a memory card, a subscriber identity module (SIM) card, a user identity module (JIM) card, and/or a removable user identity module (RUIM) card.

When the mobile terminal 110 is connected to an external cradle, the interface unit 170 may become a passage for supplying the mobile terminal 100 with power from the cradle or a passage for delivering various command signals inputted from the cradle by a user to the mobile terminal 100. Each of the command signals inputted from the cradle or the power may operate as a signal enabling the mobile terminal 100 to recognize that it is correctly loaded in the cradle.

The output unit 150 may include various components that support output requirements of the mobile terminal 100. The output unit 150 may include a display 151, an audio output module 152 and an alarm 153. The display 151 may visually display information associated with the mobile terminal 100.

For example, when the mobile terminal 100 is operating in a phone call mode, the display may provide a user interface or a graphical user interface that includes information associated with placing, conducting, and/or terminating a phone call. As another example, when the mobile terminal 100 is in a video call mode or a photographing mode, the display 151 may additionally or alternatively display images that are associated with these modes.

The display 151 may be configured as a touchscreen working in cooperation with an input device, such as a touchpad. This configuration may permit the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

The displays may be transparent to see an external environment. These may be referred to as transparent displays. A transparent LCD display may be a representative example for transparent displays.

The mobile terminal 100 may include one or more displays 151. A two-display embodiment may include one display 151 configured as an internal display (viewable when the terminal is in an opened position) and a second display 151 configured as an external display (viewable in both the open and closed positions).

The touchscreen may be configured to detect a touch input pressure as well as a touch input position and/or size.

A proximity sensor 141 may be provided within or around the touchscreen. The proximity sensor 141 may be provided within the sensing unit 140. The proximity sensor 141 may detect an object approaching a prescribed detecting surface or a presence or non-presence of an object existing around the proximity sensor 141 using electromagnetic power or infrared rays without mechanical contact. The proximity sensor 141 may be superior to a contact sensor in lifespan and utilization.

Operations of the proximity sensor 141 may now be explained. When an object approaches a sensor detecting surface while an oscillation circuit oscillates a sine radio frequency, an oscillation amplitude of the oscillation circuit may attenuate or stop. This change may be converted to an electric signal to detect a presence or a non-presence of the object. If any material (except a metallic substance) comes between the RF oscillation proximity sensor and the object, the proximity sensor 141 may detect the object without interference with the material.

Even without the proximity sensor 141, if the touchscreen is electrostatic, the touchscreen may detect proximity of a pointer through an electric field change attributed to the proximity of the pointer.

If the pointer is located in the vicinity of the touchscreen without actually contacting the touchscreen, a position of the pointer and a distance between the pointer and the touchscreen may be detected. An action of the pointer approaching the touchscreen without touching the touchscreen may be called a 'proximity touch' and an action that a pointer actually touches the touchscreen may be called a 'contact touch'. A position, at which the proximity touch is made to the touchscreen using the pointer, may be a position of the pointer vertically corresponding to the touchscreen when the pointer makes the proximity touch.

If the proximity sensor 141 is used, the proximity sensor 141 may sense a proximity touch and its pattern (e.g., a proximity touch distance, a proximity touch direction, a proximity touch speed, a proximity touch position, a proximity touch moving state, etc.). The proximity sensor 141 may output information corresponding to the sensed proximity touch action and the proximity touch pattern to the touchscreen.

FIG. 1 shows the output unit 150 having the audio output module 152 that supports audio output requirements of the mobile terminal 100. The audio output module 152 may be implemented using one or more speakers, buzzers, other audio producing devices, and/or combinations thereof.

The audio output module 152 may function in various modes such as a call-receiving mode, a call-placing mode, a recording mode, a voice recognition mode and/or a broadcast reception mode. During operation, the audio output module 152 may output audio relating to a particular function or status, such as call received, message received, and/or errors, etc.

The output unit 150 may also include the alarm 153 to signal or otherwise identify occurrence of a particular event associated with the mobile terminal 100. The alarm events may include call received, message received and a user input received.

An output of the output unit 150 may include tactile sensations. For example, the alarm 153 may vibrate in response to the mobile terminal 100 receiving a call or a message. As another example, a vibration may be provided by the alarm 153 in response to receiving user input at the mobile terminal 100, and thereby providing a tactile feedback mechanism. The various signals provided by components of the output unit 150 may be separately performed or may be performed using any combination of such components.

The memory 160 may store various types of data to support processing, control, and storage requirements of the mobile terminal 100. The data may include program instructions for applications operating on the mobile terminal 100, contact data, phonebook data, messages, pictures, video, etc.

Data for various patterns of vibration and/or sound outputted in case of a touch input to the touchscreen may be stored in the memory 160.

Map information may be further stored in the memory 160 for a user's convenience by providing the map information to a user, if necessary. A recent use history and/or a cumulative use frequency of each menu in the mobile terminal may also be stored in the memory 160.

The memory 160 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 may control overall operations of the mobile terminal 100. For example, the controller 180 may perform the control and processing associated with voice calls, data communications, instant message communication, video calls, camera operations and/or recording operations.

The controller 180 may include a multimedia module 181 that provides multimedia playback. The multimedia module 181 may be part of the controller 180, or may be implemented as a separate component.

The controller 180 may perform pattern recognizing processing for recognizing a handwriting input and a picture drawing input on the touchscreen as characters or images, respectively.

The power supply 190 may provide power required by the various components for the mobile terminal 100. The power may be internal power, external power, and/or a combination thereof Arrangements and embodiments may be implemented in a computer-readable medium using, for example, computer software, hardware, or some combination thereof. For a hardware implementation, arrangements and embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, arrangements and embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

The mobile terminal 100 may also be implemented in a variety of different configurations, such as a folder-type, a slide-type, a bar-type, a rotational-type, a swing-type and/or combination thereof. For clarity, the following disclosure may relate to a slide-type mobile terminal. However, the teachings may apply to other types of mobile terminals.

Figure 2:
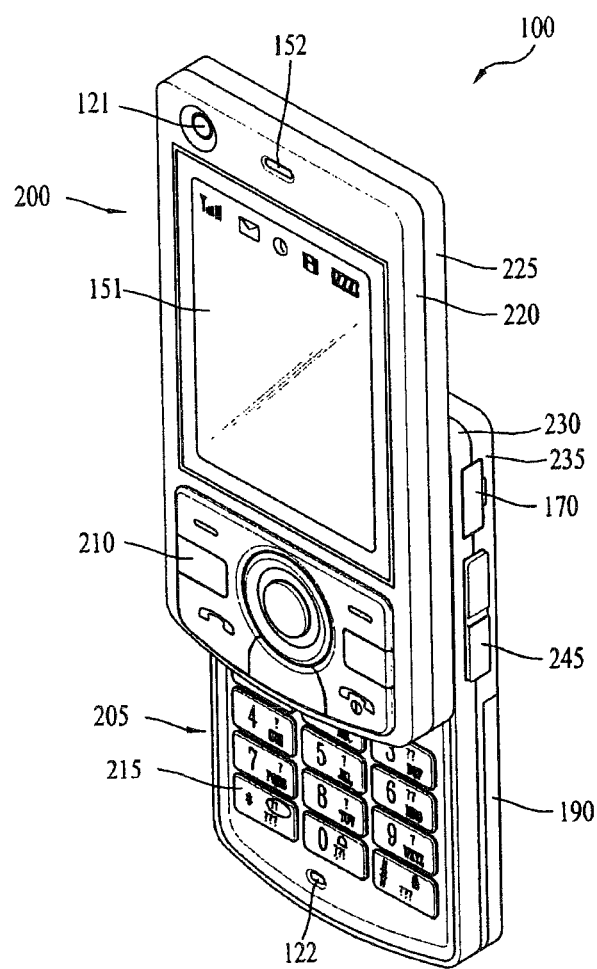
FIG. 2 is a perspective diagram of a front of a mobile terminal according to an example embodiment.

FIG. 2 is a perspective view of a front of a mobile terminal according to an example embodiment. Other embodiments, arrangements and configurations may also be provided. FIG. 2 shows that the mobile terminal 100 has a first body 200 that is configured to slidably cooperate with a second body 205.

The user input unit 130 may include a first input unit (such as function keys and four directional keys 210), a second input unit (such as keypad 215) and a third input unit (such as side keys 245). The function keys 210 may be associated with the first body 200, and the keypad 215 may be associated with the second body 205. The keypad 215 may include various keys such as numbers, characters, and/or symbols to enable a user to place a call, prepare a text or multimedia message, and/or otherwise operate the mobile terminal 100.

The first body 200 may slide relative to the second body 205 between an open position (or open state) and a closed position (or closed state). In a folder-type mobile terminal, a first body may fold and unfold relative to a second body thereof between the open position and the closed position. In a swing-type mobile terminal, a first body thereof may swing relative to a second body thereof between the open position and the closed position.

In a closed position, the first body 200 may be positioned over the second body 205 such that the keypad 215 is substantially or completely obscured by the first body 200. In the open position, a user may have access to the keypad 215. The function keys 210 may be configured for a user to enter commands such as start, stop and scroll.

The mobile terminal 100 may operate in either a standby mode (e.g., able to receive a call or message and to receive and respond to network control signaling) or an active call mode. The mobile terminal 100 may function in the standby mode when in the closed position and may function in an active mode when in the open position. The mode configuration may change as required or as desired.

The first body 200 may be formed from a first case 220 and a second case 225. The second body 205 may be formed from a first case 230 and a second case 235. The first case 230 and the second case 235 may be formed from a suitably rigid material, such as injection molded plastic, or the first case 230 and the second case 235 may be formed using metallic material, such as stainless steel (STS) and titanium (Ti).

One or more intermediate cases may be provided between the first case 230 and the second case 235 of one or both of the first body 200 and the second body 205. The first body 200 and the second body 205 may be sized to receive electronic components necessary to support operation of the mobile terminal 100.

The first body 200 may have the camera 121 and/or the audio output unit 152, which may be configured as a speaker, positioned relative to the display 151. The camera 121 may be constructed such that it can be selectively positioned relative to the first body 200 such as by rotation or by swiveling.

The function keys 210 may be positioned adjacent to a lower side of the display 151. The display 151 may be implemented as an LCD or an OLED. The display 151 may also be configured as a touchscreen having an underlying touchpad that generates signals responsive to user contact (such as with a finger or a stylus) with the touchscreen.

The second body 205 may have microphone 122 positioned adjacent to the keypad 215 and have the side keys 245, which are one type of a user input unit, positioned along the side of second body 205. The side keys 245 may be configured as hot keys, such that the side keys 245 are associated with a particular function of the mobile terminal 100. The interface unit 170 may be positioned adjacent to the side keys 245, and the power supply 190 in a form of a battery may be located on a lower portion of the second body 205.

Figure 3:
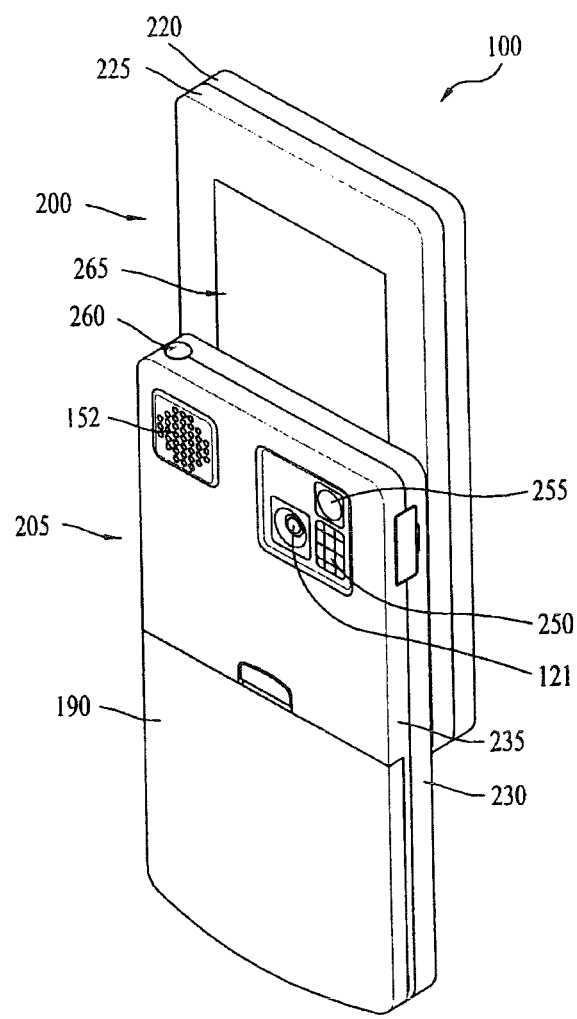
FIG. 3 is a perspective diagram of a backside of the mobile terminal shown in FIG. 2.

FIG. 3 is a rear view of the mobile terminal 100 shown in FIG. 2. FIG. 3 shows the second body 205 having the camera 121, a flash 250 and a mirror 255. The flash 250 may operate in conjunction with the camera 121. The mirror 255 may be useful for assisting a user to position the camera 121 in a self-portrait mode.

The camera 121 of the second body 205 may face a direction that is opposite to a direction faced by the camera 121 of the first body 200 (FIG. 2). Each of the cameras 121 of the first body 200 and the second body 205 may have the same or different capabilities.

The camera 121 of the first body 200 may operate with a relatively lower resolution than the camera 121 of the second body 205. This may work well during a video conference, for example, in which reverse link bandwidth capabilities may be limited. The relatively higher resolution of the camera 121 of the second body 205 (FIG. 3) may be useful for obtaining higher quality pictures for later use or for communicating with other parties.

The second body 205 may also include the audio output module 152 located on an upper side of the second body 205 and configured as a speaker. The audio output modules 152 of the first body 200 and the second body 205 may cooperate to provide stereo output. Either or both of the audio output modules 152 may operate as a speakerphone.

A broadcast signal receiving antenna 260 may be located at an upper end of the second body 205. The antenna 260 may function in cooperation with the broadcast receiving module 111 (FIG. 1). The antenna 260 may be fixed or configured to retract into the second body 205. The rear side of the first body 200 may include a slide module 265 that slidably couples with a corresponding slide module located on the front side of the second body 205.

The illustrated arrangement of the various components of the first body 200 and the second body 205 may be modified. Some or all of the components of one body may alternatively be implemented on the other body. In addition, location and relative positioning of such components may not be critical to many embodiments, and the components may be positioned at locations that differ from those shown by the representative figures.

The mobile terminal 100 of FIGS. 1-3 may operate within a communication system that transmits data via frames or packets, including both wireless and wired communication systems, and satellite-based communication systems. The communication systems may utilize different air interfaces and/or physical layers.

Examples of air interfaces utilized by the communication systems may include, for example, frequency division multiple access (FDMA), time division multiple access (TDMA), code division multiple access (CDMA), a universal mobile telecommunications system (UMTS), a long term evolution (LTE) of the UMTS, and/or a global system for mobile communications (GSM). A further description may relate to a CDMA communication system for ease of description, although the teachings may apply to other system types.

Figure 4:
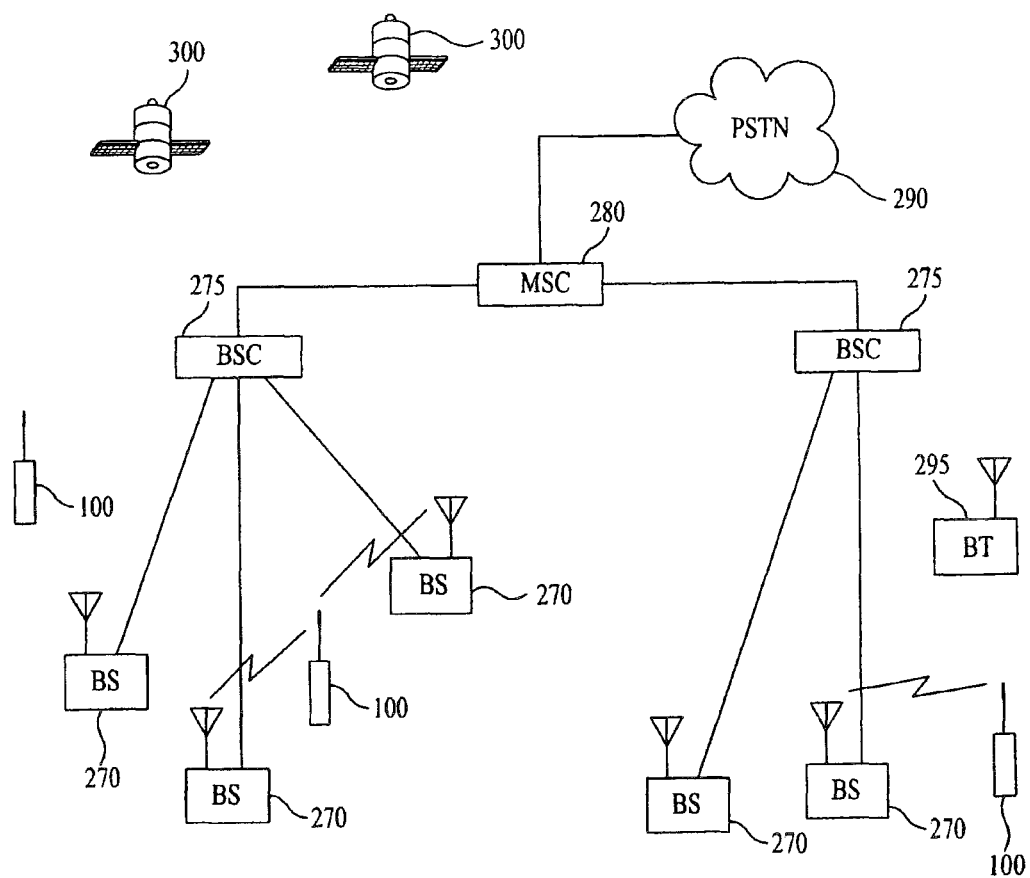
FIG. 4 is a block diagram of a wireless communication system in which a mobile terminal is operable.

As shown in FIG. 4, a CDMA wireless communication system may include a plurality of mobile terminals 100, a plurality of base stations 270, a plurality of base station controllers (BSCs) 275, and a mobile switching center (MSC) 280.

The MSC 280 may interface with a public switch telephone network (PSTN) 290. The MSC 280 may interface with the BSCs 275.

The BSCs 275 may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. The system may include more than two BSCs 275.

Each base station 270 may include one or more sectors, with each sector having an omnidirectional antenna or an antenna pointed in a particular direction radially away from the base station 270. Each sector may include two antennas for diversity reception. Each base station 270 may support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). The term "base station" may collectively refer to a BSC 275, and one or more base stations 270. The base stations 270 may also be denoted as "cell sites." Alternatively, individual sectors of a base station 270 may be referred to as cell sites.

A terrestrial digital multimedia broadcasting (DMB) transmitter 295 may broadcast to the mobile terminals 100 operating within the system. The broadcast receiving module 111 (FIG. 1) of the mobile terminal 100 may receive the broadcast signals transmitted by the DMB transmitter 295. Similar arrangements may be implemented for other types of broadcast and multicast signaling as discussed above.

FIG. 4 further shows several global positioning system (GPS) satellites 300. Such satellites facilitate locating the position of some or all of the mobile terminals 100. FIG. 4 shows two satellites, although positioning information may be obtained with more or less satellites.

The position-location module 115 (FIG. 1) of the mobile terminal 100 may cooperate with the satellites 300 to obtain desired position information. Other types of position detection technology (i.e., location technology that may be used in addition to or instead of GPS location technology) may alternatively be implemented. Some or all of the GPS satellites 300 may alternatively or additionally provide satellite DMB transmissions.

During operation of the wireless communication system, the base stations 270 may receive sets of reverse-link signals from various mobile terminals 100. The mobile terminals 100 may engage in calls, messaging, and/or other communications.

Each reverse-link signal received by a given base station 270 may be processed within that base station 270. The resulting data may be forwarded to an associated BSC 275.

The BSC 275 may provide call resource allocation and mobility management functionality including soft handoffs between the base stations 270. The BSCs 275 may also route the received data to the MSC 280, which provides additional routing services for interfacing with the PSTN 290.

The PSTN 290 may interface with the MSC 280, and the MSC 280 may interface with the BSCs 275. The BSCs 275 may control the base stations 270 to transmit sets of forward-link signals to the mobile terminals 100.

A control method applicable to the above-configured mobile terminal 100 may now be explained with respect to various embodiments. It is understood that the following embodiments may be implemented independently or through combinations thereof.

Embodiments may be implemented more easily when the display module 151 includes a touchscreen. In the following description, a display screen of the touchscreen 151 may be indicated by a reference number 400.

First Embodiment

A method of controlling a mobile terminal according to an example embodiment of the present invention may be explained with reference to FIGS. 5 to 12.

Figure 5:
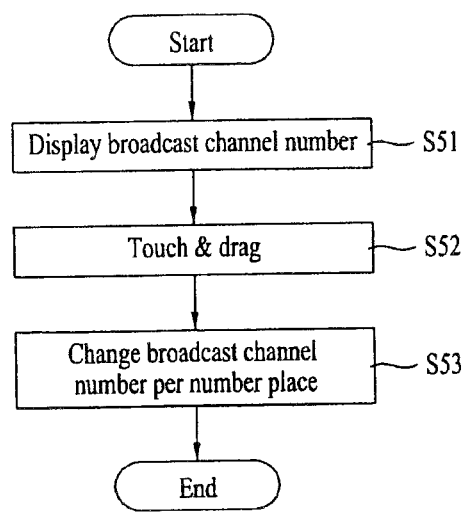
FIG. 5 is a flowchart for a method of controlling a mobile terminal according to an example embodiment of the present invention.
Figure 6:
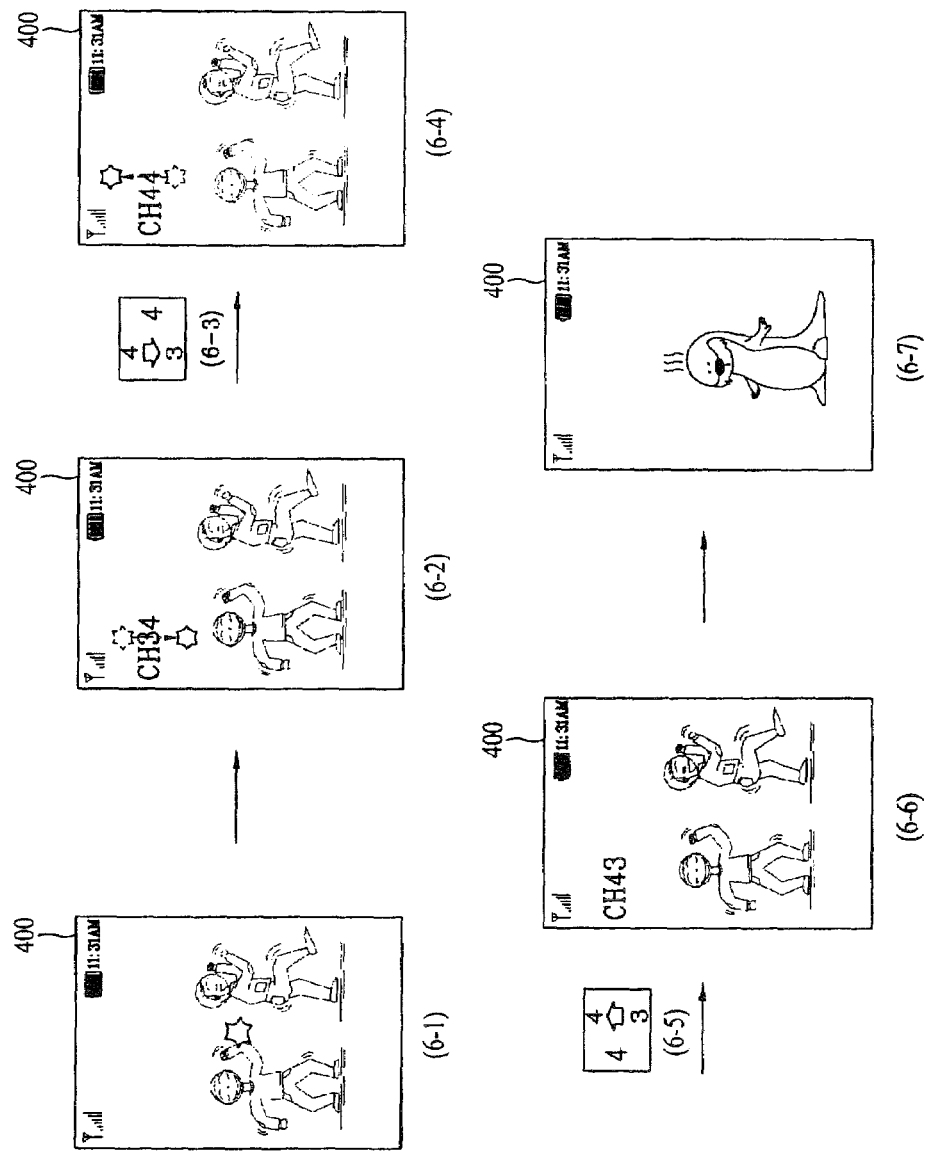
FIGS. 6 to 12 show display screens according to example embodiments of the present invention.

FIG. 5 is a flowchart for a method of controlling a mobile terminal according to an example embodiment of the present invention. FIGS. 6 to 12 show display screens according to example embodiments of the present invention. FIG. 6 includes FIGS. (6-1)-(6-7), FIG. 7 includes FIGS. (7-1)-(7-4), FIG. 8 includes FIGS. (8-1)-(8-3), FIG. 9 includes FIGS. (9-1)-(9-4), FIG. 10 includes FIGS. (10-1)-(10-5), FIG. 11 includes FIGS. (11-1)-(11-5) and FIG. 12 includes FIGS. (12-1)-(12-2).

FIG. 5 shows that a broadcast channel number may be displayed in operation S51. A touch & drag may be performed on an object displayed on the touchscreen in operation S52. A digit (or other characteristic) of the broadcast channel number may be changed in operation S53.

In the following description, broadcast numbers may be described with respect to two digit numbers, although other number of digits may also be provided. Each digit may be provided in a separate digit position of the channel number. In the number "34", the "4" may be considered in a first digit position (or 1-figure place) and the "3" may be considered in a second digit position (or 2-figure place)

FIG. (6-1) shows that a picture of a broadcast currently received by the mobile terminal 100 is displayed on the touchscreen 400. The picture of the broadcast may be touched with a pointer such as a finger, a stylus pen and the like. The touch may be considered either a proximity touch or a contact touch.

As shown in FIG. (6-2), a number '34' of a broadcast channel of the currently received broadcast may be displayed on the touchscreen 400. This may correspond to the operation S41 in FIG. 5. The number of the broadcast channel may not necessarily be displayed when a touch is performed on the broadcast picture. For example, the number of the broadcast channel may be displayed through a key manipulation performed on the user input unit 130. The number of the broadcast channel may be displayed on the picture of the broadcast.

FIG. (6-2) shows a touch & drag performed on a digit (i.e., '3') at the second digit position of the broadcast channel number (i.e., '34') in a top-to-bottom direction. This may correspond to the operation S52 in FIG. 5. The touch may be either a proximity touch or a contact touch.

FIGS. (6-3) and (6-4) show that digit in the second digit position may be changed from '3' to '4'. More specifically, the broadcast channel number is changed from '34' to '44'. This may correspond to operation S53 in FIG. 5.

If the touch & drag is performed on the digit in the second digit position in a bottom-to-top direction, the digit in the second digit position may be changed from '3' to '2'. In particular, the broadcast channel number may change from '34' to '24'.

Even if the broadcast channel number is changed from '34' to '44', the broadcast channel may not immediately switch from the channel '34' to the channel '44', since the broadcast channel number may be further changed due to a further touch & drag performed on the broadcast channel number.

FIG. (6-4) shows that a touch & drag is performed on the digit (i.e., '4') in the first digit position of the changed broadcast channel number (i.e., '44') in a bottom-to-top direction. This may correspond to operation S52 in FIG. 5.

As shown in FIGS. (6-5) and (6-6), the digit at the first digit position is changed from '4' to '3' according to a drag direction. More specifically, the broadcast channel number changes from '44' to '43'. This may correspond to operation S53 in FIG. 5.

If the touch & drag is performed on the digit (i.e., '4') in the first digit position in the top-to-bottom direction (not shown), the digit in the 1-figure place may change from '4' to '5' according to the direction of the drag. More specifically, the broadcast channel number may change from '44' to '45'.

As shown in (6-4) to (6-6), after the touch & drag is performed on the broadcast channel number, if touch & drag is not performed for a prescribed period of time, a broadcast according to the changed broadcast channel number that is received and its picture may then be displayed. That is, broadcast channel switching may be performed.

A further touch & drag may change the digit in the second digit position of the broadcast channel number and/or the digit in the first digit position by repeating the above-described procedure until expiration of a prescribed period of time.

FIG. 6 shows that the 2-digit broadcast channel number is changed per number place or digit position. A 3-figure number (or greater) may also be changed per the number place or per the digit position.

The number may be incremented if the touch & drag is performed in a top-to-bottom manner. The number may also be decremented if the touch & drag is performed in a bottom-to-top manner. Alternatively, the number may be decremented by performing the touch & drag in a top-to-bottom manner or the number may be incremented by performing the touch & drag in a bottom-to-top manner.

The number to be incremented or decremented may also be performed by touching a position above or below each digit position (or number place) without performing the touch & drag across the corresponding number place.

The touch area for changing each digit position (or number place) of the broadcast channel number may substantially overlap a digit display area (or number display area) for displaying each of the digits in their corresponding digit position (or number place). However, the touch area and the number display area need not be configured to overlap with each other. This may be explained below with reference to FIG. 7.

Figure 7:
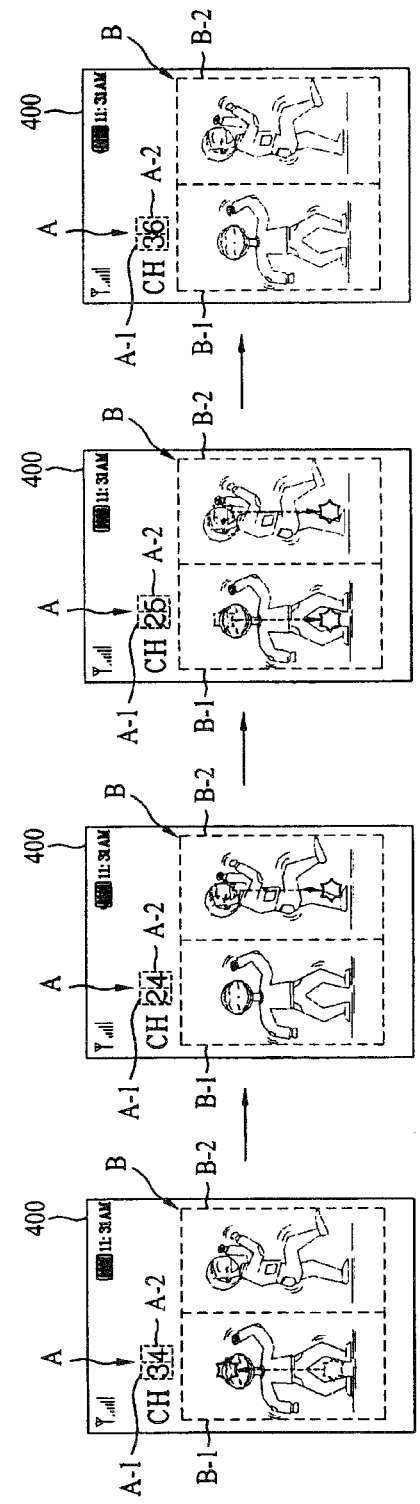

FIG. 7 shows an area 'A' for displaying the broadcast channel number. FIG. 7 also shows an area 'A-1' for displaying a digit in the second digit position of the broadcast channel number, and an area 'A-2' for displaying a digit in the first digit position of the broadcast channel number.

FIG. 7 also shows a touch area 'B' for changing the broadcast channel number, a touch area 'B-1' for changing a digit in the second digit position of the broadcast channel number, and a touch area 'B-2' for changing a digit in the first digit position of the broadcast channel number in the area B.

In FIG. 7, the area 'A' and the area 'B' are discriminated from each other when visually displayed. Alternatively, the area 'A' and the area 'B' can be configured to be virtually discriminated from each other without being visually displayed.

The area A-1 may correspond to the area B-1, and the area A-2 may correspond to the area B-2.

FIG. (7-1) shows that a picture of a broadcast currently received by the mobile terminal 100 is displayed on the touchscreen 400. The number '34' of a broadcast channel of the currently received broadcast may be displayed in the area 'A' of the touchscreen 400. A touch area for changing the broadcast channel number may be provided in the area 'B' separately from the area 'A'.

In FIG. (7-1), areas B-1 and B-2 are arranged in a rectangular shape in a horizontal direction. The areas B-1 and B-2 may also be arranged parallel with each other, in another shape and/or in a vertical direction. The areas B-1 and B-2 may be spaced apart from each other with a predetermined space rather than being arranged adjacent to each other.

FIG. (7-1) shows that a touch & drag may be performed in the area B-1 with a pointer in a bottom-to-top manner.

FIG. (7-2) shows a digit (i.e., digit at the area A-1) in the second digit position of the broadcast channel number '34' is changed from '3' to '2'. As discussed above, if a touch & drag is performed on the area B-1 with a pointer in a top-to-bottom manner, the digit in the second digit position of the broadcast channel number '34' may change from '3' to '4' (not shown).

FIG. (7-2) shows that touch & drag is performed on the area B-2 with the pointer in a top-to-bottom manner.

FIG. (7-3) shows a digit (i.e., digit at the area A-2) in the first digit position of the changed broadcast channel number '24' is changed from '4' to '5'. As discussed above, if a touch & drag is performed on the area B-2 with the pointer in a bottom-to-top manner, the digit in the first digit position of the changed broadcast channel number '24' may change from '4' to '3' (not shown).

FIG. (7-3) shows that a touch & drag may be simultaneously performed in each of the areas B-1 and B-2 in a top-to-bottom manner.

FIG. (7-4) shows that a digit in the second digit position of the changed broadcast channel number '25' is changed from '2' to '3' and a digit in the first digit position of the changed broadcast channel number '25' is changed from '5' to '6'. If a touch & drag is simultaneously performed on each of the areas B-1 and B-2 in a bottom-to-top manner, a digit in the second digit position of the changed broadcast channel number '25' changes from '2' to '1' and a digit in the first digit position of the changed broadcast channel number '25' changes from '5' to '4' (not shown).

It may be difficult to directly touch the digit in each digit position due to a relatively small-sized number display area of the broadcast channel number, a terminal user may change the digits at the respective digit positions (or number places) by utilizing a separate touch area for changing the broadcast channel number.

The number may occur if the touch & drag is performed on the touch area in a vertical direction. However, the number may also change if a touch & drag is performed in a horizontal direction (or in another direction).

The number may also not be incremented or decremented by 1 each time the touch & drag is performed. Rather, the number may be incremented or decremented by 2 (or other amount) in proportion to a length of the touch & drag.

The broadcast channel number may also correspond to a 3-digit number (or a greater number of digits). The touch area may be divided into at least three areas corresponding to a third digit position, a second digit position, and a first digit position.

The touch area (area 'B') can be formed in one of various shapes. More specifically, the touch area may be formed in concentric circle shapes. This may be explained in detail with reference to FIG. 8.

Figure 8:
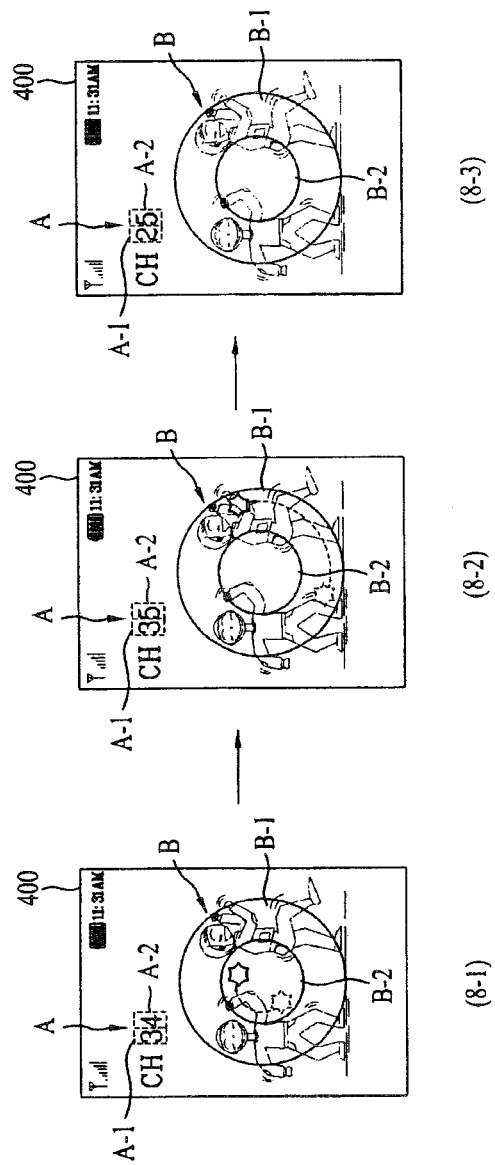
Figure 9:
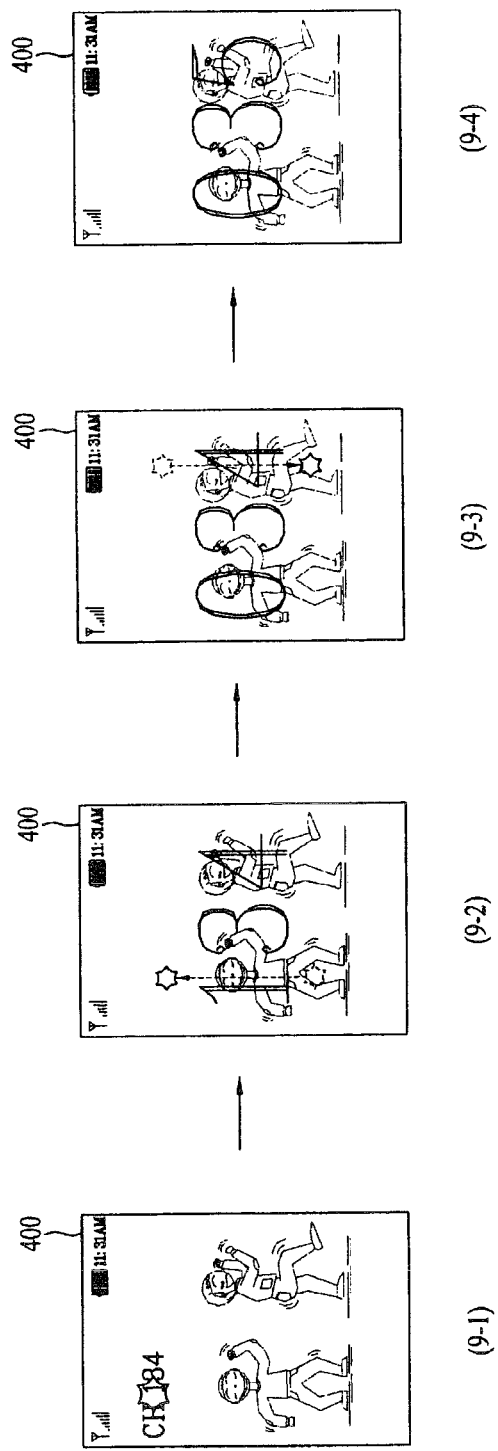
Figure 10:
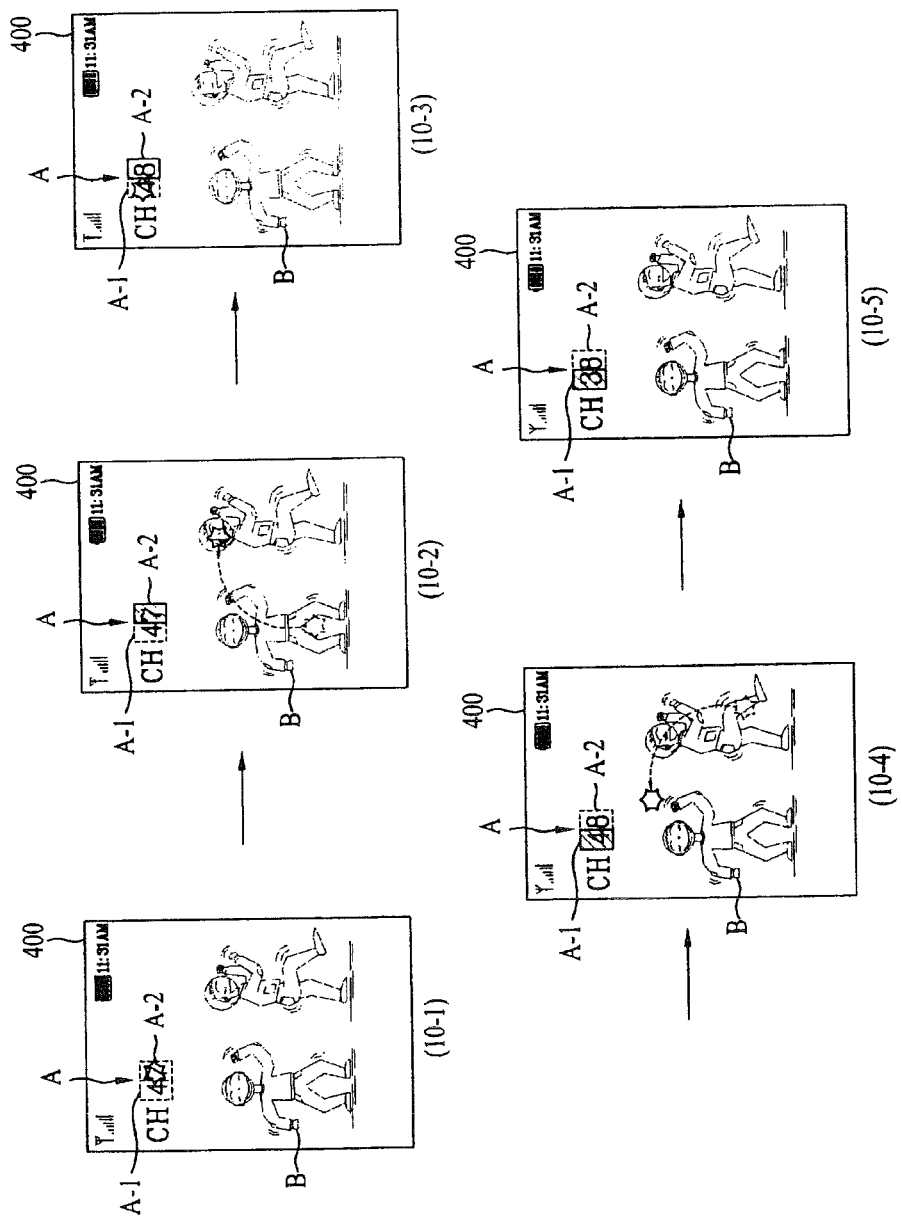
Figure 11:
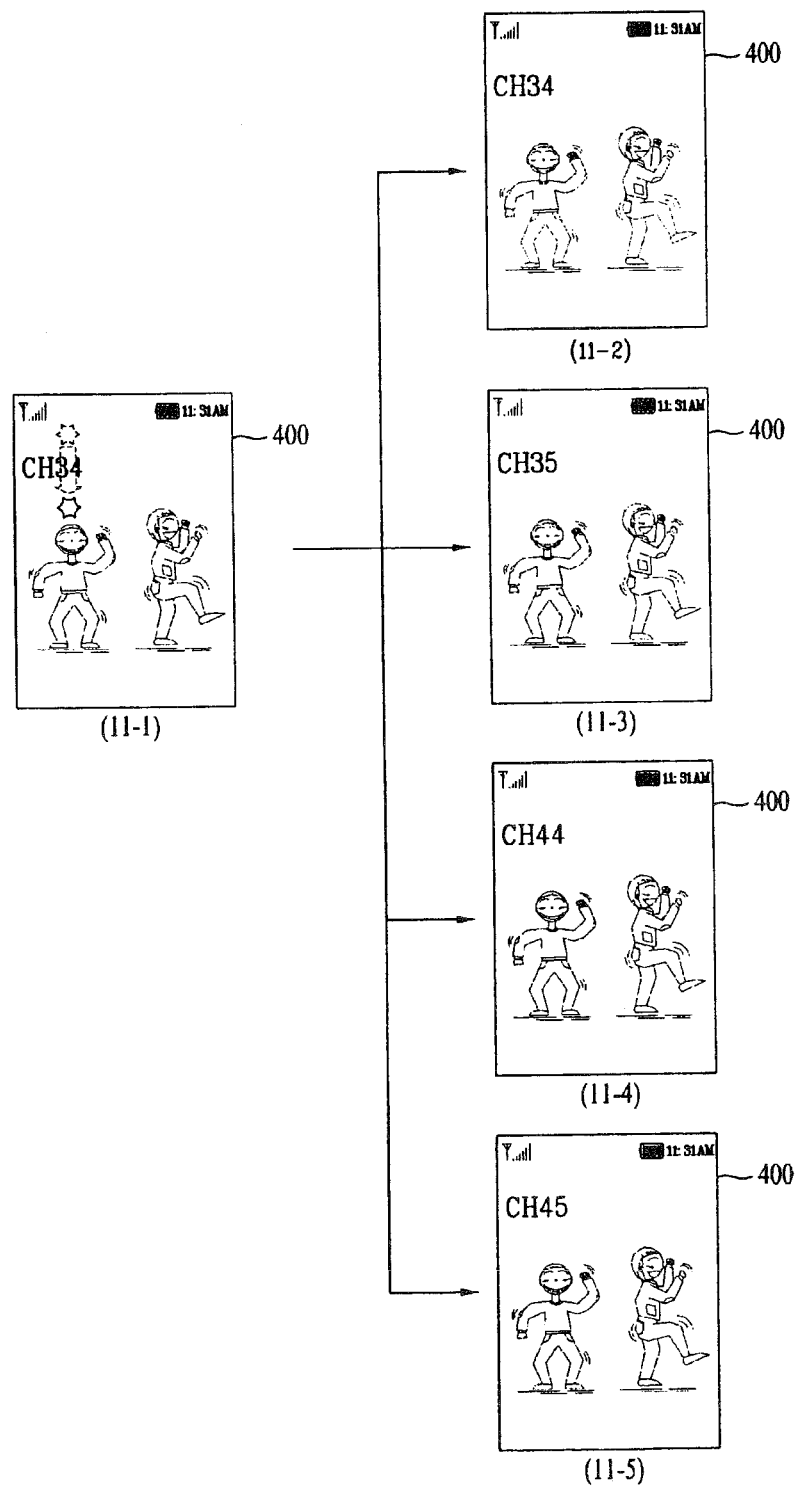
Figure 12:
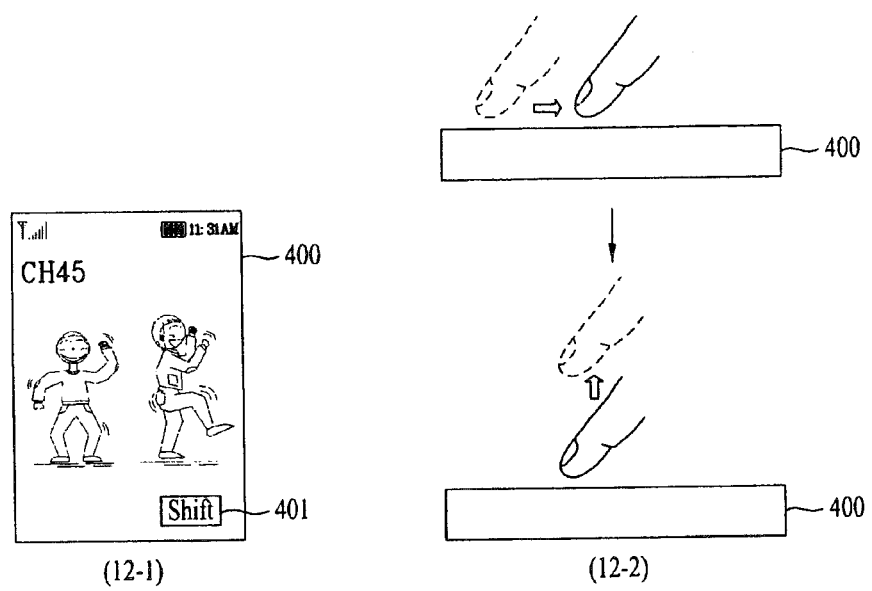

In FIG. 8, the area for displaying the broadcast channel number is shown as the area 'A' that includes the areas A-1 and A-2. The touch area for changing the broadcast channel number is shown as the area 'B' that includes the areas B-1 and B-2.

The area A-1 may correspond to the area B-1 and the area A-2 may correspond to the area B-2. The areas B-1 and B-2 may be further described.

FIG. (8-1) shows that both the area B-1 and the area B-2 are circularly arranged to form concentric circles. The areas B-1 and B-2 may not be located adjacent to each other. The areas B-1 and B-2 may be spaced apart from each other with a predetermined space in-between.

FIG. (8-1) shows that a touch & drag is performed on the area B-2 in a clockwise manner. FIG. (8-2) shows that a digit (i.e., a digit at the area A-2) in the first digit position of the broadcast channel number '34' changes from '4' to '5'. If a touch & drag is performed on the area B-2 with a pointer in a counterclockwise manner, a digit in a first digit position of the broadcast channel number '34' may change from '4' to '3' (not shown).

FIG. (8-2) shows that a touch & drag is performed on the area B-1 in a counterclockwise manner. FIG. (8-3) shows that a digit (i.e., a digit at the area A-1) in the second digit position of the changed broadcast channel number '35' changes from '3' to '2'. If a touch & drag is performed on the area B-1 with a pointer in a clockwise manner, a digit in the second digit position of the changed broadcast channel number '35' may change from '3' to '4' (not shown).

The number may not increment or decrement by 1 each time the touch & drag is performed. Rather, the number may be incremented or decremented by 2 (or other number) in proportion to a length of the touch & drag.

If the touch & drag is performed in a clockwise manner, then the number may be incremented, and if the touch & drag is performed in a counterclockwise manner, then the number may be decremented. Alternatively, the number may increment if the touch & drag is performed in a counterclockwise manner, and the number may decrement if the touch & drag is performed in a clockwise manner.

The broadcast channel number may correspond to a 3-digit number (or greater than 3 digits). The touch area may be divided into at least three areas (i.e., forming concentric circles) corresponding to a third digit position, a second digit position and a first digit position.

In FIGS. 7 and 8, the display area for the broadcast channel number and the touch area for changing the broadcast channel number may be discriminated from each other. The channel number may be changed even if the display area for the broadcast channel number is formed smaller on the touchscreen.

Even if the display area and the touch area are not discriminated from each other, the channel number may be easily changed by enlarging the display area. This may be explained with reference to FIG. 9.

FIG. (9-1) shows a picture of a broadcast currently received by the mobile terminal 100 displayed on the touchscreen 400. The number '134' of a broadcast channel of the currently received broadcast is displayed on the touchscreen 400.

If the broadcast channel number is touched, then digits of the broadcast channel number may be enlarged on the touchscreen 400 as shown in FIG. (9-2).

FIG. (9-2) to (9-4) shows that a digit in a digit position (or number place) may be changed by performing touch & drag on the corresponding digit position of the broadcast channel number.

FIGS. 7 and 8 relate to the touch area being formed by being divided into digit positions of the broadcast channel number. However, the touch area may not be formed by being discriminated per the digit position (or number place) of the broadcast channel number, as may be explained with reference to FIG. 10.

FIG. (10-1) shows that a picture of a broadcast currently received by the mobile terminal 100 is displayed on the touchscreen 400. The number '47' of a broadcast channel of the currently received broadcast is displayed on the area 'A' of the touchscreen 400.

An area (i.e., the area A-2) for displaying a digit in the first digit position of the broadcast channel number '47' may be touched. FIG. (10-2) shows the area A-2 selected by the touch is visually displayed. The visual displaying method may be executed in one of various ways. For example, the corresponding area, as shown in FIG. (10-2), may be highlighted, color or boldness of digit(s) in the corresponding area may be changed, and/or digit(s) in the corresponding area may flicker on and off.

FIG. (10-2) shows that a touch & drag is performed on a random position of the touchscreen 400 (except the broadcast channel number display area 'A') in a clockwise manner. In particular, a rest area on the touchscreen 400 (except the area 'A') may become the touch area (i.e., area 'B') for changing the broadcast channel number.

FIG. (10-3) shows that a digit (i.e., a digit in the area A-2) in the first digit position of the broadcast channel number '47' changes from '7' to '8'.

FIG. (10-3) shows that an area (i.e., the area A-1) for displaying in the second digit position place of the changed broadcast channel number '48' may be touched. FIG. (10-4) shows that the area A-1 selected by the touch is visually displayed.

In FIG. (10-4), a touch & drag is performed at a random position on the touchscreen 400 (except the broadcast channel number display area 'A') in a counterclockwise manner.

FIG. (10-5) shows that a digit (i.e., a digit in the area A-2) in the second digit position of the changed broadcast channel number '48' changes from '4' to '3'.

If the touch & drag is performed on the touchscreen 400 in a clockwise or counterclockwise manner, the broadcast channel number changes per the digit position (or number place). The broadcast channel number may be changed per the digit position (or number place) when the touch & drag is performed on the touchscreen in a vertical or horizontal direction (or other direction).

When the display area (i.e., the area 'A') of the broadcast channel number is touched and dragged to change the broadcast channel number, both a first digit position display area (area A-2) and a second digit position display area (area A-1) may be simultaneously touched and dragged by a single touch. This may be explained with reference to FIG. 11.

FIG. (11-1) shows that a picture of a broadcast currently received by the mobile terminal 100 is displayed on the touchscreen 400. The number '34' of a broadcast channel of the currently received broadcast is displayed on the touchscreen 400.

A drag may be performed after a touch has been performed across both digit "3" in a second digit position of the broadcast channel number '34' and a digit '4' in a first digit position of the broadcast channel number '47'.

FIG. (11-2) shows a situation in which the touch & drag is erroneous, and the broadcast channel number does not change. FIG. (11-3) shows that only the digit in the first digit position of the broadcast channel number may change. FIG. (11-4) shows that only the digit in the second digit position of the broadcast channel number may change. FIG. (11-5) shows that the digits in both the first digit position and the second digit position of the broadcast channel number may change.

After the broadcast channel number has changed, if there is no input of the touch & drag for a prescribed duration, a channel may switch to the broadcast of the changed number. A different channel switching scheme may be explained with reference to FIG. 12.

FIG. (12-1) shows that when the broadcast channel number is changed, a channel switching icon 401 may be displayed on the touchscreen for the broadcast channel switching to the changed number.

Therefore, after the broadcast channel number has changed, if the channel switching icon 401 is touched, the broadcast channel may switch to the changed number. The channel switching icon 401 may not always be provided on the touchscreen. The broadcast channel may switch to the changed number when a key manipulation of the user input unit is performed.

FIG. (12-2) shows that after the broadcast channel number has changed by performing proximity touch & drag on the touchscreen and when the proximity touch is released, the broadcast channel may switch to the changed number.

Second Embodiment

A method of controlling a mobile terminal according to an example embodiment of the present invention may be explained with reference to FIGS. 13 and 14.

Figure 13:
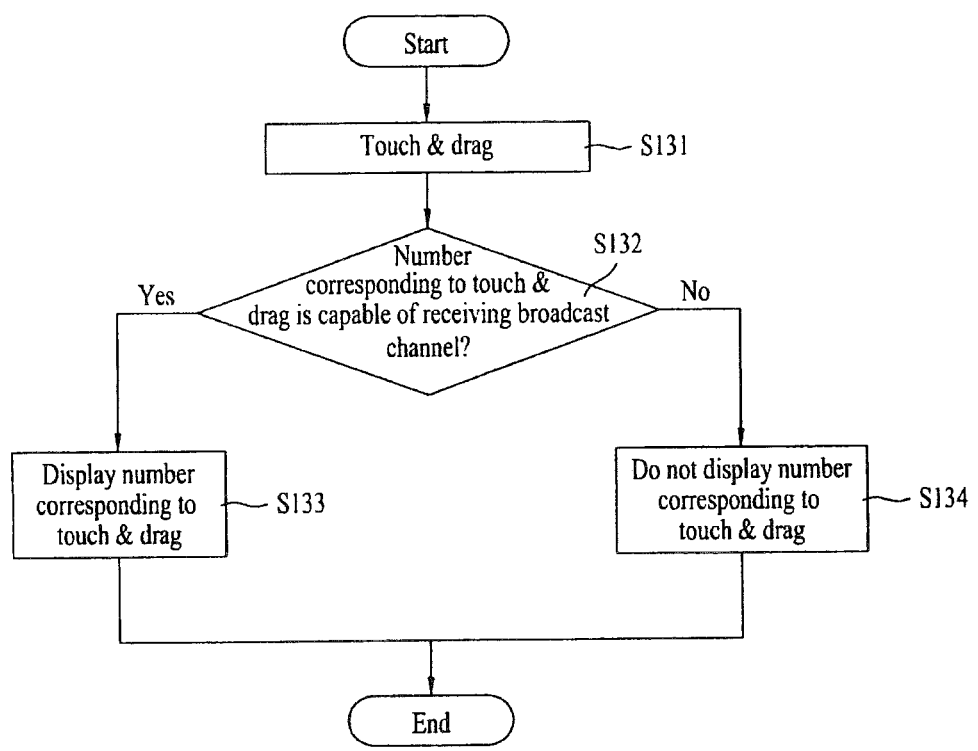
FIG. 13 is a flowchart for a method of controlling a mobile terminal according to an example embodiment of the present invention.
Figure 14:
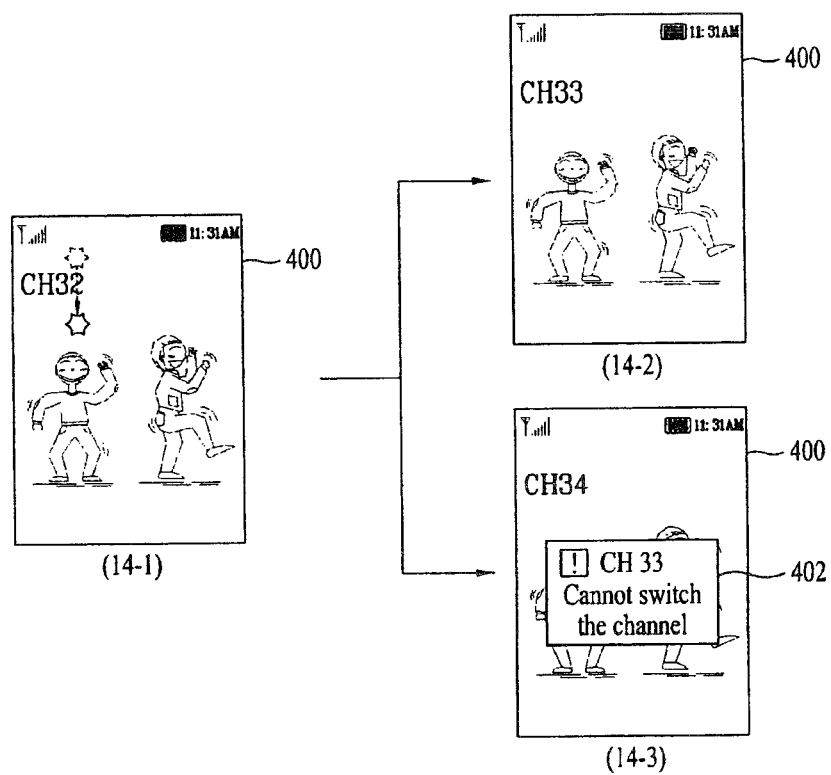
FIG. 14 shows display screens according to an example embodiment of the present invention.

FIG. 13 is a flowchart for a method of controlling a mobile terminal according to an example embodiment of the present invention. FIG. 14 shows display screens according to an example embodiment of the present invention. Other embodiments, configurations and operations are also within the scope of the present invention. FIG. 14 includes FIGS. (14-1)-(14-3).

FIG. 13 shows that a touch & drag may be performed in operation S131. In operation S132, a determination may be made regarding whether the mobile terminal may receive a broadcast channel having a number corresponding to the touch & drag. If the determination is 'Yes', then a number corresponding to the touch & drag may be displayed in operation S133. If the determination is 'No', then the number corresponding to the touch & drag may not be displayed in operation S134.

When the mobile terminal 100 moves from one location to another location, a scan process may be performed on whole broadcast frequencies to recognize broadcast channels that are receivable in the new location. After completion of the scan process, the broadcast channels that are receivable in the moved location may be obtained and stored in the mobile terminal 100. A process for changing the broadcast channel number may now be provided.

FIG. (14-1) shows that a picture of a broadcast currently received by the mobile terminal 100 is displayed on the touchscreen 400. The number '32' of a broadcast channel of the currently received broadcast is displayed on the touchscreen 400.

A touch & drag may be performed on the touchscreen to change the current broadcast channel number from '32' to '33'. This may correspond to operation S131 in FIG. 13.

The controller 180 may decide whether the broadcast channel of the change-attempted number '33' is receivable in the location into which the mobile terminal has moved. This may correspond to operation S132 in FIG. 13.

As a result of the decision, when the broadcast channel of the change-attempted number '33' is decided as being receivable in the corresponding location, the current broadcast channel number '32', as shown in FIG. (14-2), may change to the change-attempted number '33'. The change-attempted number '33' may therefore be displayed. This may correspond to operation S133 in FIG. 13.

If the broadcast channel of the change-attempted number '33' is not receivable in the corresponding location, the current broadcast channel number '32' may not change to the change-attempted number '33'. This may correspond to operation S134 in FIG. 13.

FIG. (14-3) shows that a popup window 402 may announce on the touchscreen 400 that it may not switch the channel to the change-attempted number '33'. The current broadcast channel number '32' may change to a number (e.g., '34') right next to the change-attempted number '33' from among numbers of receivable broadcast channels. In particular, when the switch of the broadcast channel is attempted, the reception-impossible change-attempted number '33' may be skipped rather than being displayed.

There may be a broadcast channel recognized as received in the course of the scan process, or a reception of the broadcast channel may not be good due to a temporary reason. This may be explained with reference to FIGS. 15 and 16.

Figure 15:
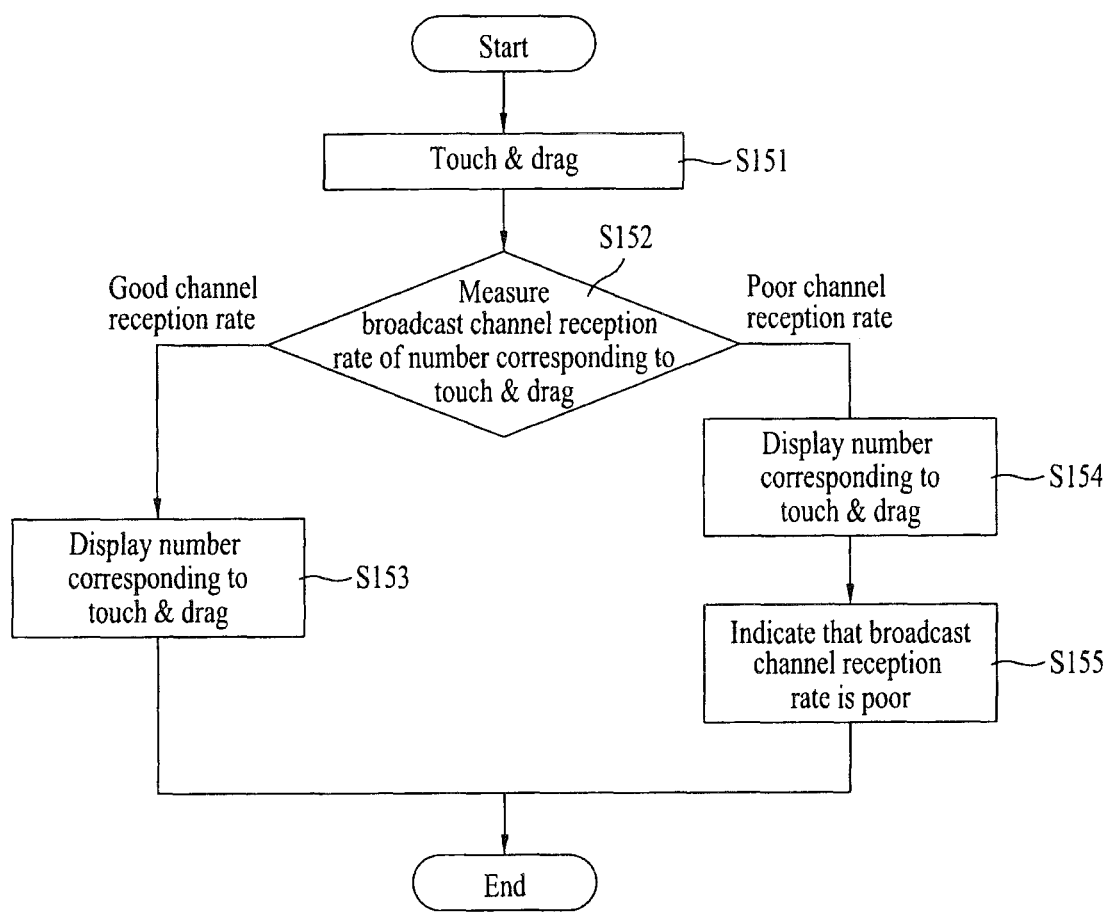
FIG. 15 is a flowchart for a method of controlling a mobile terminal according to an example embodiment of the present invention.
Figure 16:
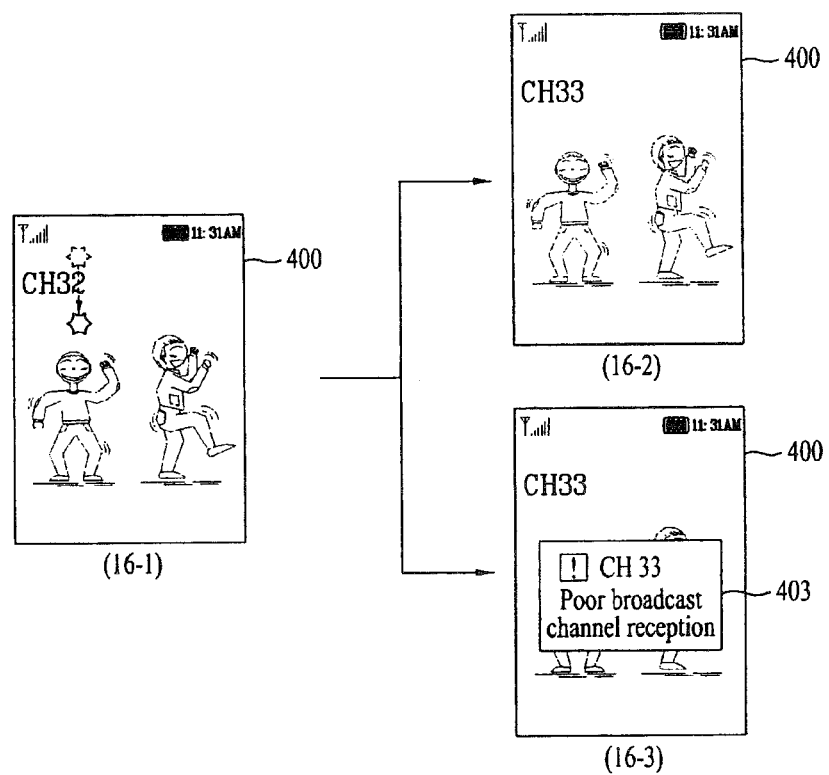
FIG. 16 shows display screens according to an example embodiment of the present invention.

FIG. 15 is a flowchart for a method of controlling a mobile terminal according to an example embodiment of the present invention. FIG. 16 shows display screens according to an example embodiment of the present invention. Other embodiments, arrangements, configurations and operations are also within the scope of the present invention. FIG. 16 includes FIGS. (16-1)-(16-3).

FIG. 15 shows that a touch & drag may be performed in operation S151. In operation S152, a measurement may be made regarding a broadcast channel reception rate of a number corresponding to the touch & drag. If the measurement determines a good channel reception rate, then a number corresponding to the touch & drag may be displayed in operation S153. If the measurement determines a poor channel reception rate, then a number corresponding to the touch & drag may be displayed in operation S154. An indication that the broadcast channel reception rate is poor may be made in operation S155.

FIG. (16-1) shows that a picture of a broadcast currently received by the mobile terminal 100 is displayed on the touchscreen 400. The number '32' of a broadcast channel of the currently received broadcast is displayed on the touchscreen 400.

A touch & drag for changing the current broadcast channel number from '32' to '33' may be performed on the touchscreen 400. This may correspond to operation S151 in FIG. 15.

The controller 180 may measure a reception rate of the broadcast channel of the change-attempted number '33'. This may correspond to operation S152 in FIG. 15. This may measure the reception rate of the broadcast channel of the change-attempted number using one of the at least two broadcast receiving modules 112.

As a result of the measurement, if the reception rate of the broadcast channel of the change-attempted number '33' is good, the current broadcast channel number '32' may change to the change-attempted number '33' as shown in FIG. (16-2) and the changed number '33' may then be displayed. This may correspond to operation S153 in FIG. 15.

If the reception rate of the broadcast channel of the change-attempted number '33' is not good, although the current broadcast channel number '32' changes to the change-attempted number '33', as shown in FIG. (16-3), a popup window 403 may announce that the reception rate of the broadcast channel is not good. This may correspond to operation S155 in FIG. 15. The announcement indicating that the reception rate of the broadcast channel is not good may be announced by text or background color, font size or text flickering for the broadcast channel number. The number having the poor broadcast channel reception rate may be skipped rather than being displayed.

Third Embodiment

A method of controlling a mobile terminal according to an example embodiment of the present invention may be explained with reference to FIGS. 17 to 19.

Figure 17:
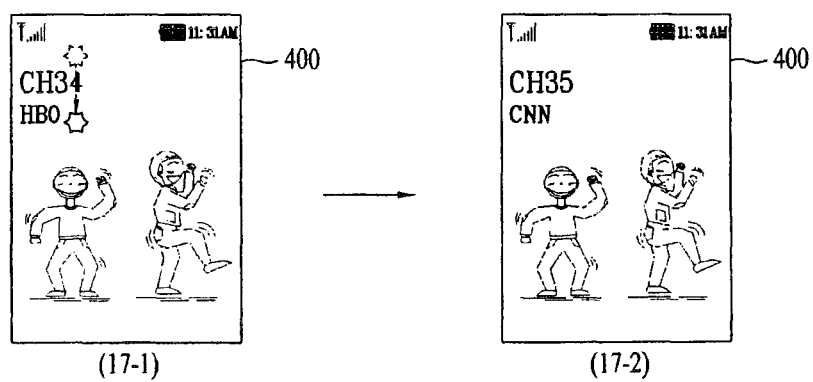
Figure 18:
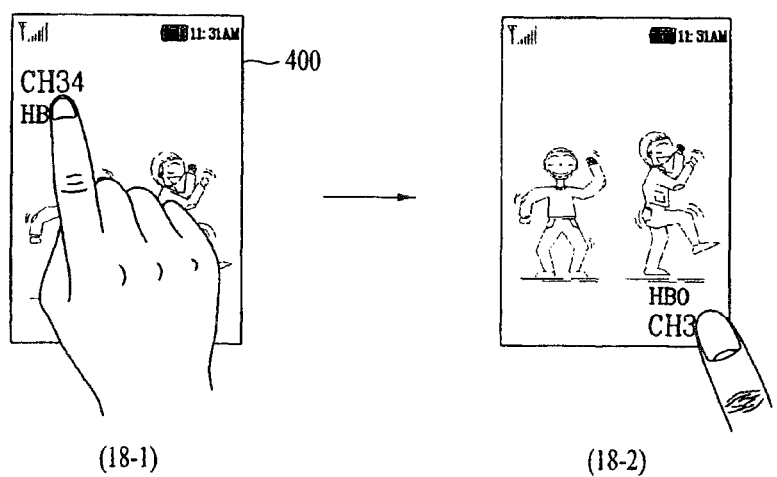

FIGS. 17 to 19 show display screens according to example embodiments of the present invention. Other embodiments and configurations are also within the scope of the present invention. FIG. 17 includes FIGS. (17-1)-(17-2), FIG. 18 includes FIG. (18-1)-(18-2) and FIG. 19 includes FIGS. (19-1)-(19-5).

FIG. (17-1) shows that a picture of a broadcast currently received by the mobile terminal 100 is displayed on the touchscreen 400. The number '34' of a broadcast channel of the currently received broadcast is displayed on the touchscreen 400.

Broadcast channel information (e.g., a broadcast channel name 'HBO') corresponding to the number '34' may also be displayed on the touchscreen 400.

The broadcast channel number may be obtained by referring to broadcast relevant information such as EPG, ESG, etc.

FIG. (17-1) shows a touch & drag for changing the broadcast channel number from '34' to '35' may be performed on the touchscreen 400.

FIG. (17-2) shows that the changed broadcast channel number '35' is displayed. Broadcast channel information (e.g., broadcast channel name 'CNN') corresponding to the changed number '35' may be displayed on the touchscreen 400.

Therefore, when the broadcast channel number is changed, a terminal user may recognize information on the broadcast channel for the changed number based on the displayed broadcast channel information even before the broadcast channel actually switches to the changed number.

The displayed positions of the broadcast channel number and the broadcast channel information may be explained with reference to FIG. 18.

In FIG. (18-1), the broadcast channel number and the broadcast channel information are displayed in a left top of the touchscreen 400. If the broadcast channel number is touched with a finger to change the broadcast channel number, the touchscreen 400 may be blocked by another finger that obstructs a user's field of vision.

FIG. (18-2) shows that that both the broadcast channel number and the broadcast channel information may be displayed in a right bottom of the touchscreen. Although the broadcast channel number is touched with a finger to change the broadcast channel number, the extent that the touchscreen 400 is blocked by the finger may be minimized. The broadcast channel number and the broadcast channel information may also be displayed in a middle bottom or a left bottom of the touchscreen as well as in the right bottom of the touchscreen.

In FIG. (18-2), the broadcast channel information is displayed above the broadcast channel. Although the broadcast channel number is touched with a finger to change the broadcast channel number, it may prevent the broadcast channel information from being blocked by the finger.

Various examples for displaying the broadcast channel information may be further explained with reference to FIG. 19.

FIG. (19-1) shows that a name 'HBO' of the broadcast channel corresponding to the broadcast channel number and a currently broadcasted program title 'Die Hard' are displayed as the broadcast channel information.

FIG. (19-2) shows that sub-channel information '-2' of the broadcast channel corresponding to the broadcast channel number is displayed as the broadcast channel information.

FIG. (19-3) shows that a genre 'News' of the broadcast channel corresponding to the broadcast channel number and a name 'CNN' of the broadcast channel are displayed as the broadcast channel information.

FIG. (19-4) shows a name 'MBC' of the broadcast channel corresponding to the broadcast channel number and a side name 'drama' of the broadcast channel are displayed as the broadcast channel information.

FIG. (19-5) shows that an indication 'Favorite' for indicating that the broadcast channel number is preset by a terminal user is displayed as the broadcast channel information. An announcement for announcing that a broadcast channel number is the preferred channel preset by the terminal user can be displayed by text or background color, text size or text flickering of the broadcast channel number.

Fourth Embodiment

A method of controlling a mobile terminal according to an example embodiment of the present invention may be explained with reference to FIGS. 20 to 23.

Figure 20:
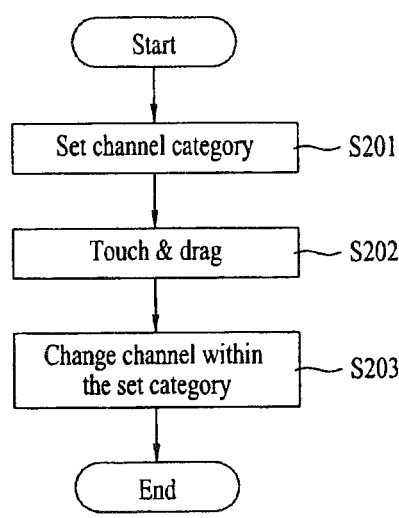
FIG. 20 is a flowchart for a method of controlling a mobile terminal according to an example embodiment of the present invention.
Figure 21:
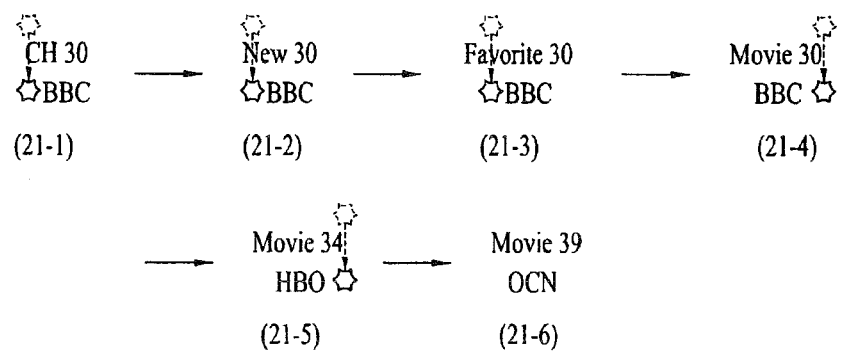
FIGS. 21 to 23 show display screens according to an example embodiment of the present invention.
Figure 22:
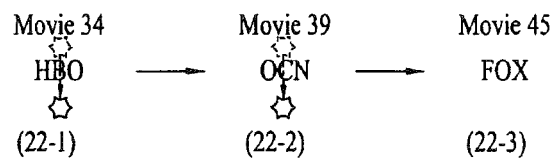
Figure 23:
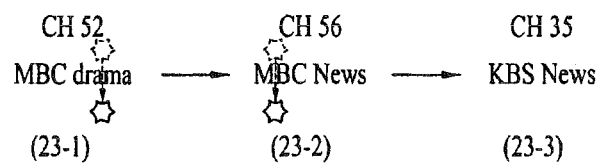

FIG. 20 is a flowchart for a method of controlling a mobile terminal according to an example embodiment of the present invention. FIGS. 21 to 23 show display screens according to an example embodiment of the present invention. Other embodiments, arrangements, configurations and operations are also within the scope of the present invention.

FIG. 20 shows that a channel category may be set in operation S201. A touch & drag may be performed in operation S202. In operation, a channel may be within the set category.

The broadcast channel number and the broadcast channel information may be displayed on the touchscreen 400.

FIG. (21-1) shows that a broadcast channel number '30' of a currently received broadcast and broadcast channel information 'BBC' of the currently received broadcast are displayed on the touchscreen 400.

A broadcast channel category for changing the broadcast channel number may be set. This may correspond to operation S201 in FIG. 20. Various schemes may exist for determining the category. For example, the category may be determined by generating a separate popup window for setting the category.

FIG. 21 shows a unique category setting method. A touch & drag may be performed on a part 'CH' written next to the broadcast channel number to determine the category. In FIG. (21-1) to FIG. (21-4), the categories may be sequentially set in an order of all categories, such as 'CH', news channel category 'News', favorite channel category 'Favorite' and movie channel category 'Movie' when the part 'CH' is touched in one direction.

FIG. (21-1) shows that while the category is set to the movie channel category, it may attempt to change the current broadcast channel number '30'. This may correspond to operation S202 in FIG. 20.

FIG. (21-5) shows that the current broadcast channel number '30' changes to another broadcast channel number '34' belonging to the movie channel category. This may correspond to operation S203 in FIG. 20.

This means that broadcast channels corresponding to '31', '32' and '33' that fail to belong to the movie channel category may be skipped when changing the broadcast channel number.

The broadcast channel information 'HBO' corresponding to the changed number may be displayed.

FIG. (21-5) shows that while the category is set to the movie channel category, it may attempt to again change the changed broadcast channel number '34'.

FIG. (21-6) shows that the changed broadcast channel number '34' is re-changed into a further broadcast channel number '39' belonging to the movie channel category. This means that broadcast channels corresponding to '35', '36', '37' and '38' that fail to belong to the movie channel category may be skipped in case of re-changing the broadcast channel number.

Subsequently, the broadcast channel information 'OCN' corresponding to the re-changed number may be displayed.

The broadcast channel number may be changed by performing a touch & drag on the broadcast channel information. This may be explained with reference to FIG. 22.

FIG. (22-1) shows that a broadcast channel number '34' of a currently received broadcast and broadcast channel information 'HBO' corresponding to the number are displayed on the touchscreen 400. The broadcast channel category may be set to the movie channel category 'Movie'.

The broadcast channel information 'HBO' may then be touched and dragged.

FIG. (22-2) shows that the broadcast channel number '34' changes to another broadcast channel number '39' within the broadcast channel category and the broadcast channel information 'OCN' corresponding to the changed number is displayed.

FIG. (22-2) shows that touch & drag is again performed on the changed broadcast channel information 'OCN'.

The broadcast channel number '39' is changed to another broadcast channel number '45' within the broadcast channel category and the broadcast channel information 'FOX' corresponding to the re-changed number is displayed.

The broadcast channel number may also change by performing touch & drag on the broadcast channel information. This may be explained with reference to FIG. 23.

FIG. (23-1) shows a broadcast channel number '52' of a currently received broadcast and broadcast channel information 'MBC drama' corresponding to the number are displayed on the touchscreen 400. A name 'MBC' of the broadcast channel and a side name 'drama' of the broadcast channel may be displayed as the broadcast channel information.

A touch & drag may be performed on the side name 'drama' of the broadcast channel in the broadcast channel information.

FIG. (23-2) shows that the broadcast channel number '52' changes to a number '56' of a broadcast channel having the same broadcast channel name with a different side name.

A side name 'News' of the changed broadcast channel may also be displayed.

FIG. (22-2) shows that touch & drag may be performed on the broadcast channel name 'MBC' in the changed broadcast channel information.

FIG. (23-3) shows that the changed broadcast channel number '56' is changed to a number '35' of a broadcast channel having the different broadcast channel name with the same side name.

The changed broadcast channel name 'KBS' may be displayed.

A terminal and controlling method thereof may provide effects and/or advantages. A terminal user may select a specific broadcast channel from a plurality of broadcast channels received by a mobile terminal. The touch & drag action may also be replaced by a flicker action.

The above-described methods may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). The computer may include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a broadcast receiving unit;
a touchscreen to display a broadcast channel number; and
a controller to control the broadcast channel number displayed on the touchscreen and to change a digit of the displayed broadcast channel number based on movement of a pointer relative to the touchscreen,
wherein when a proximity touch and movement of the pointer occurs relative to the touchscreen and the proximity touch is maintained after the movement of the pointer, the controller is configured to change the displayed broadcast channel number while maintaining the proximity touch without changing a broadcast channel displayed on the touchscreen to a broadcast channel corresponding to the changed broadcast channel number,
wherein when the proximity touch of the pointer relative to the touchscreen is released, the controller is configured to change the broadcast channel currently displayed on the touchscreen to the broadcast channel corresponding to the changed broadcast channel number, and
wherein the controller is configured to determine a reception rate of the broadcast channel of the changed broadcast channel number, and displays the broadcast channel of the changed broadcast channel number when the determined reception rate is above a rate for deciding whether the determined reception rate is good or is not good, and the controller is configured to display an indication that a broadcast channel of the changed broadcast channel number is not receivable or has a poor reception rate when the determined reception rate is below the rate, and
wherein the touchscreen includes at least two touch areas each corresponding to a different digit position of the broadcast channel number.

2. The mobile terminal of claim 1, wherein when one of the touch areas is touched by the pointer, the controller is configured to change the digit in the digit position corresponding to the touched touch area.

3. The mobile terminal of claim 2, wherein the touch areas at least partially overlap digit display areas of the touchscreen, and each of the digit display areas displays a corresponding digit of the broadcast channel number.

4. The mobile terminal of claim 2, wherein the touch areas are arranged differently from digit display areas of the touchscreen, and each of the digit display areas displays a corresponding digit of the broadcast channel number.

5. The mobile terminal of claim 2, wherein the two touch areas are arranged as concentric circles with a first touch area provided within a second touch area, and wherein when the pointer touches one of the concentric circle type touch areas and moves in a circumferential direction of the one concentric circle, the controller is configured to change the digit in the digit position of the broadcast channel number that corresponds to the touched touch area.

6. The mobile terminal of claim 2, wherein when the pointer moves relative to the touchscreen in a first direction, the controller is configured to increment a digit in the digit position corresponding to the touched touch area, and when the pointer moves relative to the touchscreen in a second direction different than the first direction, the controller is configured to decrement the digit in the digit position corresponding to the touched touch area.

7. The mobile terminal of claim 1, wherein when the pointer touches an area corresponding to the displayed broadcast channel number, the controller is configured to enlarge digit display areas, and each of the digit display areas displays a corresponding digit of the broadcast channel number.

8. The mobile terminal of claim 7, wherein when the pointer touches one of the digit display areas and moves relative to the digit display area, the controller is configured to change the digit in the digit position corresponding to the touched digit display area.

9. The mobile terminal of claim 1, wherein when the pointer touches an area corresponding to one digit position of the broadcast channel number and then the pointer moves relative to a position of the touchscreen, the controller is configured to change the digit in the digit position corresponding to the touched digit display area according to a direction of the movement of the pointer.

10. The mobile terminal of claim 1, wherein the controller is configured to change the displayed broadcast channel number to one of a currently receivable broadcast channel and a broadcast channel currently having a good reception rate.

11. The mobile terminal of claim 1, wherein the controller further controls a broadcast channel number of a preset broadcast channel to be displayed by being discriminated.

12. The mobile terminal of claim 1, wherein the controller further controls displaying of channel information of the broadcast channel of the changed broadcast channel number.

13. The mobile terminal of claim 12, wherein the channel information includes at least one of genre information of the broadcast channel, broadcasting station information of the broadcast channel, currently broadcasted program information of the broadcast channel, and sub-channel information of the broadcast channel.

14. The mobile terminal of claim 12, wherein the controller further controls displaying such that channel information is displayed above the broadcast channel number on the touchscreen.

15. The mobile terminal of claim 14, wherein the controller further controls displaying such that the broadcast channel information and the channel information are displayed on a bottom of the touchscreen.

16. The mobile terminal of claim 1, wherein after a prescribed duration from a time of changing the digit of the displayed broadcast channel number, the controller controls a channel switching based on a changed broadcast channel number.

17. The mobile terminal of claim 1, wherein the controller further controls a category of a broadcast channel to be preset and controls the broadcast channel number to be changed to be within a range of the preset category.

18. A method of controlling a mobile terminal, comprising:
displaying a broadcast channel number on a touchscreen of the mobile terminal; and
changing a digit of a broadcast channel number based on movement of a pointer relative to the touchscreen,
wherein when a proximity touch and movement of the pointer occurs relative to the touchscreen and the proximity touch is maintained after the movement of the pointer, the displayed broadcast channel number is changed while maintaining the proximity touch without changing a broadcast channel displayed on the touchscreen to a broadcast channel corresponding to the changed broadcast channel number, and wherein when the proximity touch of the pointer relative to the touchscreen is released, the broadcast channel currently displayed on the touchscreen is changed to the broadcast channel corresponding to the changed broadcast channel number;

determining a reception rate of the broadcast channel of the changed broadcast channel number;

displaying the broadcast channel on the touchscreen when the determined reception rate is above a predetermined rate for deciding whether the determined reception rate is good or is not good; and displaying an indication on the touchscreen that the broadcast channel of the changed broadcast channel number is not receivable or has a poor reception rate when the determined reception rate is below the predetermined rate, wherein the touchscreen includes first and second touch areas each corresponding to a different digit position of the broadcast channel number.

19. The method of claim 18, wherein when the first touch area is proximity touched by the pointer, the digit in the first digit position corresponding to the touched first touch area is changed, and when the second touch area is proximity touched by the pointer, the digit in the second digit position corresponding to the touched second touch area is changed.

20. The method of claim 19, wherein the first and second touch areas are arranged as concentric circles with the first touch area provided within the second touch area, and wherein when the pointer proximity touches a first one of the concentric circles corresponding to the first touch area, the digit in the first digit position of the broadcast channel number that corresponds to the touched first touch area is changed, and when the pointer proximity touches a second one of the concentric circles and moves in a circumferential direction, the digit in the second digit position of the broadcast channel number that corresponds to the touched second touch area is changed.

* * * * *